Figure 2:
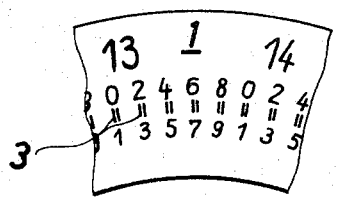

United States Patent [19]
Feist et al.

[11] 3,732,015
[45] May 8, 1973

[54] ANGLE-MEASURING DEVICE

[75] Inventors: Wieland Feist; Busso Von Chamier, both of Jena, Germany

[73] Assignee: Jenoptik Jena G.m.b.H., Jena, District of Gera, Germany

[22] Filed: Nov. 19, 1970

[21] Appl. No.: 97,424

[52] U.S. Cl. .................................................356/139
[51] Int. Cl. ................................................G01c 1/06
[58] Field of Search.......................................356/139

[56] References Cited

UNITED STATES PATENTS

| | | | |
|---|---|---|---|
| 1,508,585 | 9/1924 | Wild | 356/139 |
| 2,221,317 | 11/1940 | Wild | 356/139 |
| 2,363,877 | 11/1944 | Larsen et al. | 356/139 |
| 2,480,237 | 8/1949 | Godfrey et al. | 356/139 |
| 2,619,002 | 11/1952 | Baker | 356/139 |
| 2,911,877 | 11/1959 | Drodofsky | 356/139 |
| 3,068,741 | 12/1962 | Werner | 356/139 |

FOREIGN PATENTS OR APPLICATIONS

| | | | |
|---|---|---|---|
| 1,235,007 | 2/1967 | Germany | 356/139 |

*Primary Examiner*—Ronald L. Wibert
*Assistant Examiner*—F. L. Evans

[57] ABSTRACT

In an angle-measuring instrument having a reading microscope, the digital readings on the dial are displayed by apertures in a diaphragm which is located in the field of vision of the reading microscope. These apertures are: one for the division lines; one for the degree numbers; two for the even and odd numbers, respectively; and one for both the 1-minute numbers and the second numbers. The two 10-minute apertures are staggered relative to one another in such a manner that either an even number or an odd number is displayed at one time.

2 Claims, 5 Drawing Figures

PATENTED MAY 8 1973 3,732,015

INVENTORS
Wieland Feist
Busso v. Cramier-Gliscrinski

ANGLE-MEASURING DEVICE

This invention relates to angle-measuring devices incorporating a reading system, a graduated dial which is numbered in degrees of an arc and subdivided by half as many 20-minute lines as 10-minute numbers, and a diaphragm which has apertures so co-ordinated to the degree numbers and the 10-minute numbers as to display only the readout.

In known devices of the foregoing type for digital indication of angles in theodolites operating with optical averages, a reading window shows a 10-minute number and the respective degree number, the arrangement being such that two 10-minute numbers are assigned to each degree number. As each 1° interval in the other known dials has only one degree number assigned to it, the association of two 10-minute numbers to each of the degree numbers involves a considerable increase in the cost of manufacture of such dials, particularly parent dials. Moreover, an increase in the quantity of graduation numbers necessarily means more room for deposits of dust and other impurities.

In other known dial systems, each 1° interval has only one degree number assigned thereto and, with the reading system in reading position, only one 10-minute number is visible in the field of vision, the 10-minute numbers being provided on a scale which lies in the eyepiece image plane of the reading system. This reading system depends on the co-operation of a complicated isolating prism of difficult and costly manufacture and, moreover, it is technologically impossible for each reading system to have a scale disposed in the eyepiece image plane or in a plane conjugate thereto.

The present invention aims at obviating the foregoing disadvantages by providing an angle-measuring device of low manufacturing cost in which the image separation is effected without complicated isolating prisms.

To this end the present invention consists of angle-measuring device, wherein two consecutive 10-minute numbers on top of one another are assigned to each line of the 20-minute graduation, and wherein the reading system includes two diaphragm apertures which are staggered relative to one another by half a 20-minute interval and in the reading position of the dial offer the view of only one 10-minute number in the reading system and each of which is allotted to one of the two 10-minute numbers of each graduation line. Greatest possible simplicity of the imaging system is obtained by arranging the degree numbers and the numbers of the 20-minute graduation at the one ends of the graduation lines. Advantageously, the staggered diaphragms lie in a plane conjugate to the dial, for example in the eyepiece-image plane of the reading system, the staggering being in definite relationship to the magnification by the reading system of the viewed part of the dial.

The arrangement may be such that the two series of 10-minute numbers either advance or lag.

Figure 1:
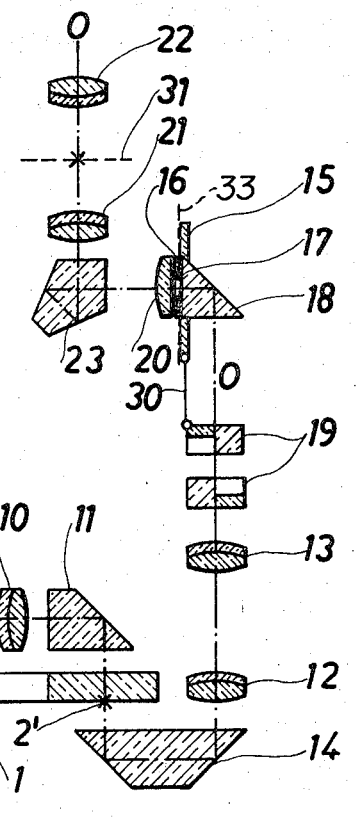
Figure 3:
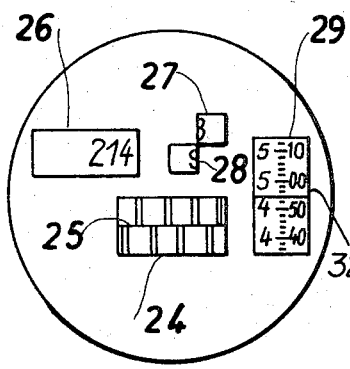
Figure 4:
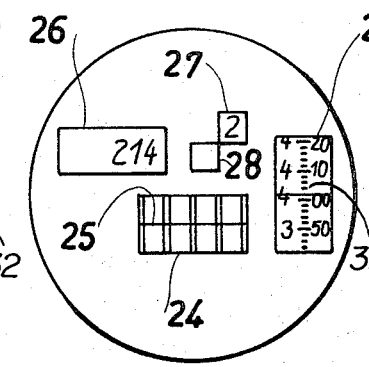
Figure 5:
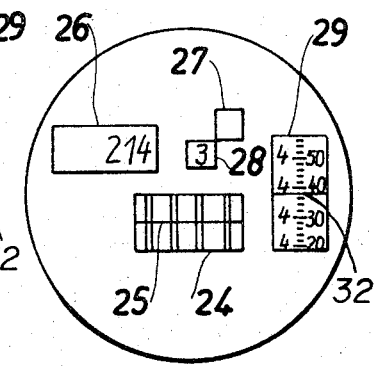

In order that the invention may be more readily understood, reference is made to the accompanying drawings which illustrate diagrammatically and by way of example one embodiment of an angle-measuring device in accordance therewith, and in which FIG. 1 is a diagrammatical representation for explaining the principle of the invention, FIG. 2 shows part of the graduated dial, and FIGS. 3 to 5 show the eyepiece-image field of the reading system.

In FIG. 1 of the drawings, a dial 1 rotatable about an axis X—X carries a graduation in which each division line 3 (FIG. 2) has an even 10-minute number allotted to its one end and has the subsequent odd 10-minute number allotted to its other end. If the subdivision is centesimal, each fifth 20-minute line, i. e. the 20-minute line with an even digit 0, has a degree number associated with it. A reflector 4 is rotatable about an axis Y—Y, which is at right angles to the plane of the drawing. Artificial or natural light striking the reflector 4 travels through a prism 5, a lens 7 and a prism 6 cemented thereto and arrives at a point 2 on the dial 1, from whence it proceeds through a prism 8, an imaging system 9, 10 and a prism 11 so as to arrive at a point 2' on the dial 1, which is diametrically opposed to the point 2. The point 2 is located in the object-side focal plane of the imaging system 9, 10; and the point 2', in the image-side focal plane thereof. Since the dial 1 in the embodiment here in consideration operates on the principle of optical averages, the point 2 serves as both index and scale division for the diametrically opposed point 2', which in its turn does the same for the point 2. The point 2' also lies in the object-side focal plane of an imaging system 12, 13 which, via a prism 14, receives the imaging ray from the point 2'. The image-side focal plane 33 of the imaging system 12, 13 includes a micrometer dial 15 and a face 17 of an isolating prism 18. The face 17 carries a diaphragm 16. Reciprocal displacement, at right angles to the optical axis of the imaging system 12, 13, of the two optical wedges of a wedge micrometer 19 located between the imaging system (objective system) 12, 13 and the prism 18 entails a displacement of the dial 15 in the plane of the face 17 at right angles to the part of the optical axis of the imaging system 12, 13 which is bent by the prism 18. The means for displacing the wedges of the micrometer 19 relatively to one another is a mechanical connection 30, for example a gear set, which is shown only schematically. An imaging system 20, 21 and an eyepiece 22 are so included in the optical ray path in the rear of the diaphragm 16 that the object-side focal plane 31 of the eyepiece 22 coincides with the image-side focal plane of the imaging system 20, 21. A pentaprism 23 located between the optical members 20 and 21 deflects the imaging ray path at right angles. All the aforementioned imaging parts have an optical axis O—O in common, which is bent several times. The common focal plane 31 of the eyepiece 22 and the imaging system 20, 21 on the one hand, and the common focal plane 33 of the imaging system 20, 21 and the objective system 12, 13 on the other, are optically conjugated to one another and are therefore, in the meaning of the present specification, the common image planes of the objective system 12, 13 and the eyepiece 22. Conjugated to these focal planes are also the focal planes that include the points 2 and 2'.

When the point 2 is illuminated by the optical members 4, 5, 7, 6, the imaging system 9, 10 and the prisms 8, 11 produce an image thereof in the reserve sense in juxtaposition to the point 2'. After the deviation of the ray path by the prism 14, the optical system 12, 13 images the points 2 and 2' on the face 17, the plane of which includes the micrometer graduation of the dial 15. The diaphragm 16 divides the eyepiece field-of-view as shown in FIGS. 3 to 5. The optical system 20, 21 produces an image of the plane of the diaphragm 16 in the object-side focal plane of the eyepiece 22, through which the image can be viewed.

The image in the focal plane of the eyepiece 22 is shown in FIGS. 3 to 5 at different positions of the dial 1 relative to the optical systems 9, 10 and 12, 13 and at different adjustments of the wedges of the micrometer 19. The display of the measured magnitude of an angle is as follows:

in a window 24, the division lines 3 (FIG. 2) of the diametrically opposed points 2 and 2', which are separated from one another by a line 25 at right angles thereto;

in a window 26, the degree number;

in a window 27, the even 10-minute number;

in a window 28, the odd 10-minute number; and in window 29, the minute numbers and the second numbers. The minute and second numbers are read against an index line 32.

In FIG. 3, the division lines of the diametrically opposed points do not coincide in the window 24. Accordingly, there is no exact reading.

In FIG. 4, the division lines on either side of the separation line 25 coincide in the window 24 after manipulation of the micrometer 19, so that a magnitude 214° 24' 02" can be read.

In FIG. 5, the diametrically opposed division lines also coincide, the reading showing a magnitude 214° 34' 38".

The principle of optical averages may be replaced by any other in which an index, or a system of indices, is caused to register with a graduation and the respective relative motion can be read against a micrometer scale. The double lines shown in FIG. 2 that limit the intervals on the dial 1 may be replaced by single lines.

We claim 1.

An angle-measuring device comprising a dial having numbered degree intervals of an arc, each interval of said dial being subdivided into numbered 20-minute intervals, each of said 20-minute intervals lying between two graduation lines, each of said lines having two consecutive 10-minute numbers coordinated thereto, a reading system made up of at least one objective system and at least one eyepiece which are in optical alignment with one another and have a common optical axis and at least one common image plane, said dial being located in the object-side focal plane of said objective system, said image plane being optically conjugated to said focal plane, said objective system imaging part of said dial in said image plane, said eyepiece being for observation of said image plane, an index in a plane optically conjugated to said focal plane, a micrometer dial bearing 1-minute and second numbers located in said image plane, a diaphragm located in said image plane and provided with a first window for the graduation lines and the index, a second window for the degree numbers, a third window for the even 10-minute numbers, a fourth window for the odd 10-minute numbers, and at least a fifth window for both the 1-minute and second numbers, said third window and said fourth window being staggered relative to one another in such a manner that either an even or an odd number is displayed at one time, adjustable optico-mechanical means connected to said micrometer dial for causing relative motion and coincidence of said index and said graduation lines in said first window, said fifth window bearing a reading mark and its display being equivalent to the amount of relative motion of said index and said graduation.

2. A device as claimed in claim 1, wherein the intervals on said dial are limited by double lines having the even 10-minute numbers at their one ends and the odd 10-minute numbers at their other ends.

* * * * *